United States Patent [19]
Pelstring et al.

[11] Patent Number: 6,084,323
[45] Date of Patent: *Jul. 4, 2000

[54] SPINDLE MOTOR HAVING A MAGNET WHICH IS FIELD CENTERED RELATIVE TO THE STATOR

[75] Inventors: Robert Michael Pelstring, Santa Cruz; Gunter Karl Heine, Aptos, both of Calif.

[73] Assignee: Seagate Technology, Inc., Scotts Valley, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/876,927

[22] Filed: Jun. 16, 1997

Related U.S. Application Data

[62] Division of application No. 08/437,452, May 8, 1995, Pat. No. 5,664,314.

[51] Int. Cl.[7] ..................................... H02K 5/02
[52] U.S. Cl. ................... 310/67 R; 310/90; 310/156; 360/99.08; 360/98.07
[58] Field of Search ............... 310/90.5, 90, 156, 310/67 R; 360/98.07, 99.04, 99.08; 384/110, 120, 113, 133, 114; 277/80; 29/596, 598

[56] References Cited

U.S. PATENT DOCUMENTS

| | | | |
|---|---|---|---|
| 4,101,371 | 7/1978 | Aggen | 29/598 X |
| 4,141,137 | 2/1979 | De Wolf et al. | 29/596 |
| 4,193,184 | 3/1980 | Futterer | 29/596 |
| 4,797,762 | 1/1989 | Levy et al. | 360/99.06 |
| 5,027,028 | 6/1991 | Skipper | 310/328 |
| 5,047,677 | 9/1991 | Mineta et al. | 310/67 R |
| 5,165,701 | 11/1992 | Koba | 277/80 |
| 5,238,254 | 8/1993 | Takii et al. | 277/80 |
| 5,357,162 | 10/1994 | Ajyoshizawa et al. | 310/90 |
| 5,501,760 | 3/1996 | Mukawa | 156/275.7 X |
| 5,610,464 | 3/1997 | Asano et al. | 310/156 |

FOREIGN PATENT DOCUMENTS

| | | | |
|---|---|---|---|
| 58-22566 | 2/1983 | Japan | 29/596 |

*Primary Examiner*—Thomas M. Dougherty
*Assistant Examiner*—Tran N Nguyen
*Attorney, Agent, or Firm*—Westman Champlin & Kelly P.A.

[57] ABSTRACT

A spindle motor in a disc drive has a rotor assembly rotatably mounted to a base. A stator is mounted to the base and a magnet is mounted to the rotor assembly. The magnet or the stator is allowed to move in an axial direction relative to the other under the influence of magnetic interaction between the magnet and the stator. The magnet and stator are then rigidly fixed relative to one another in the axial direction.

10 Claims, 7 Drawing Sheets

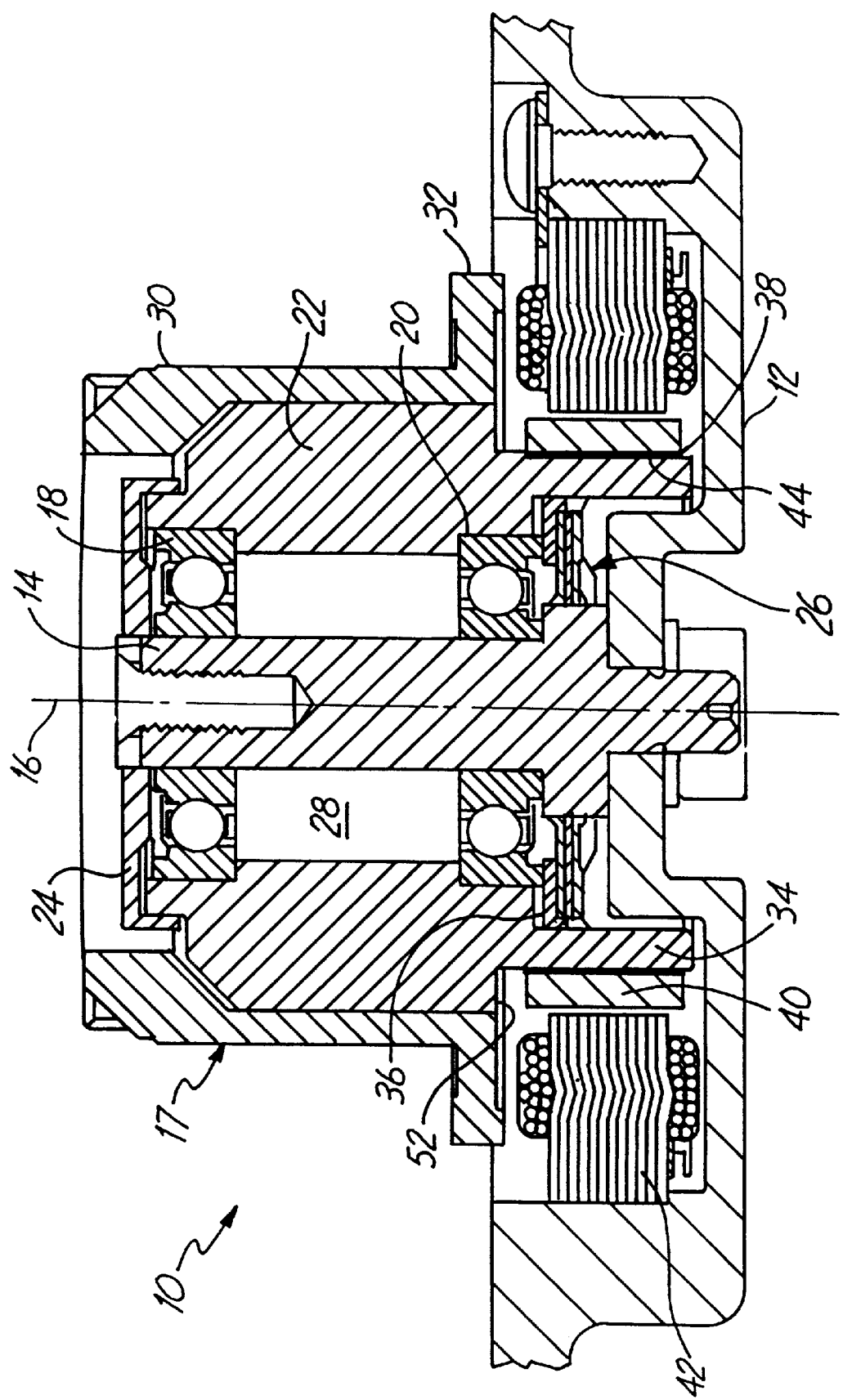

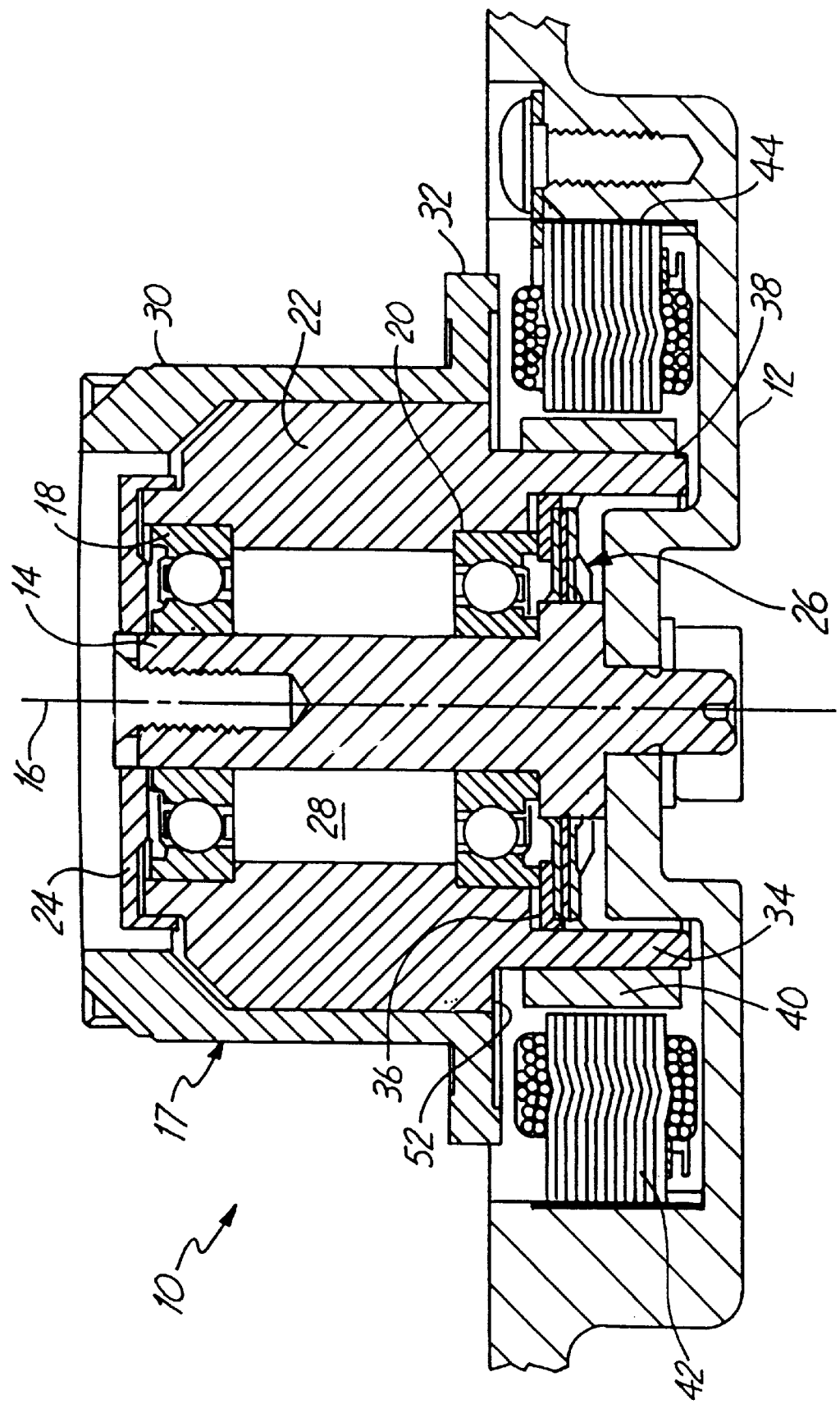

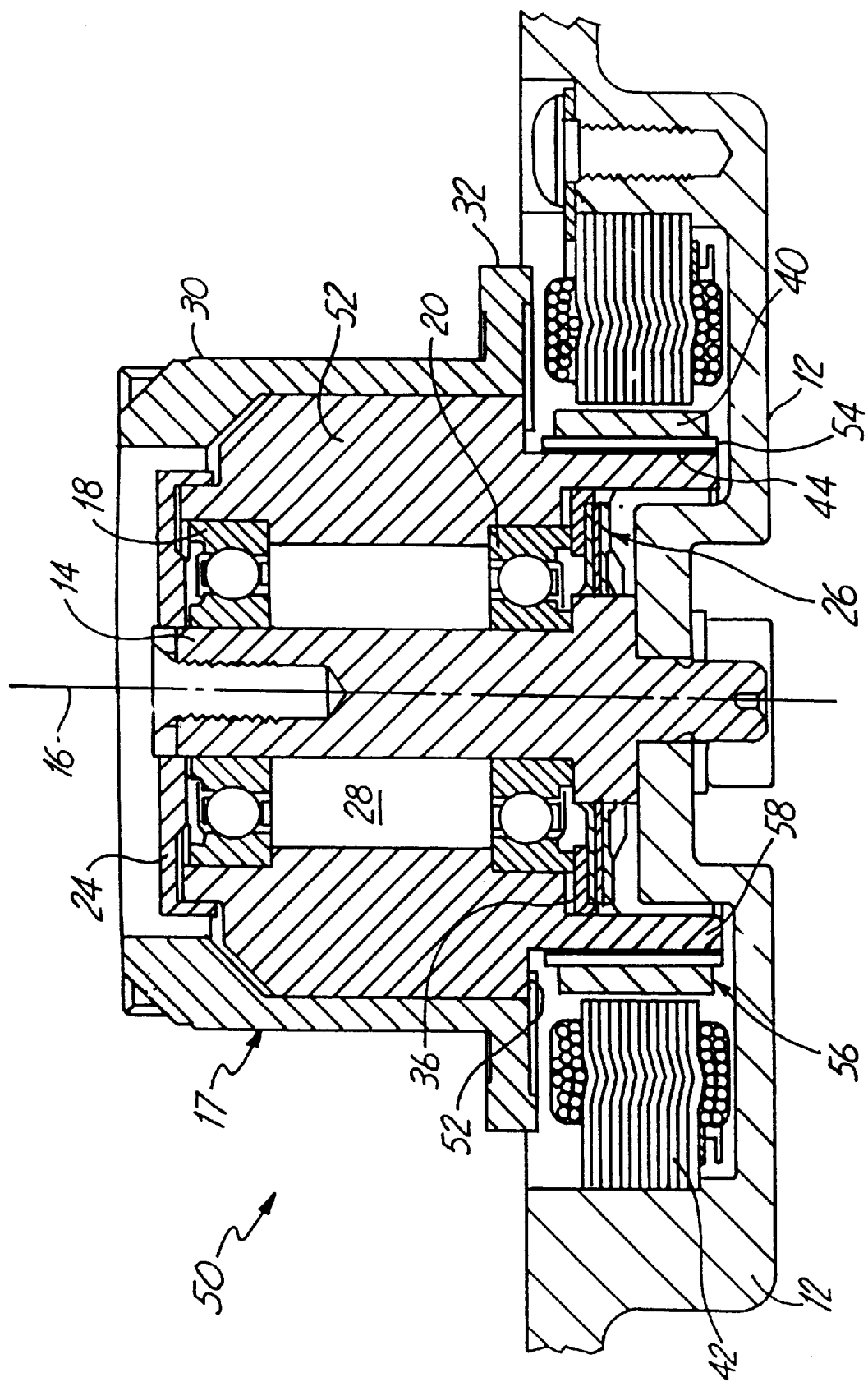

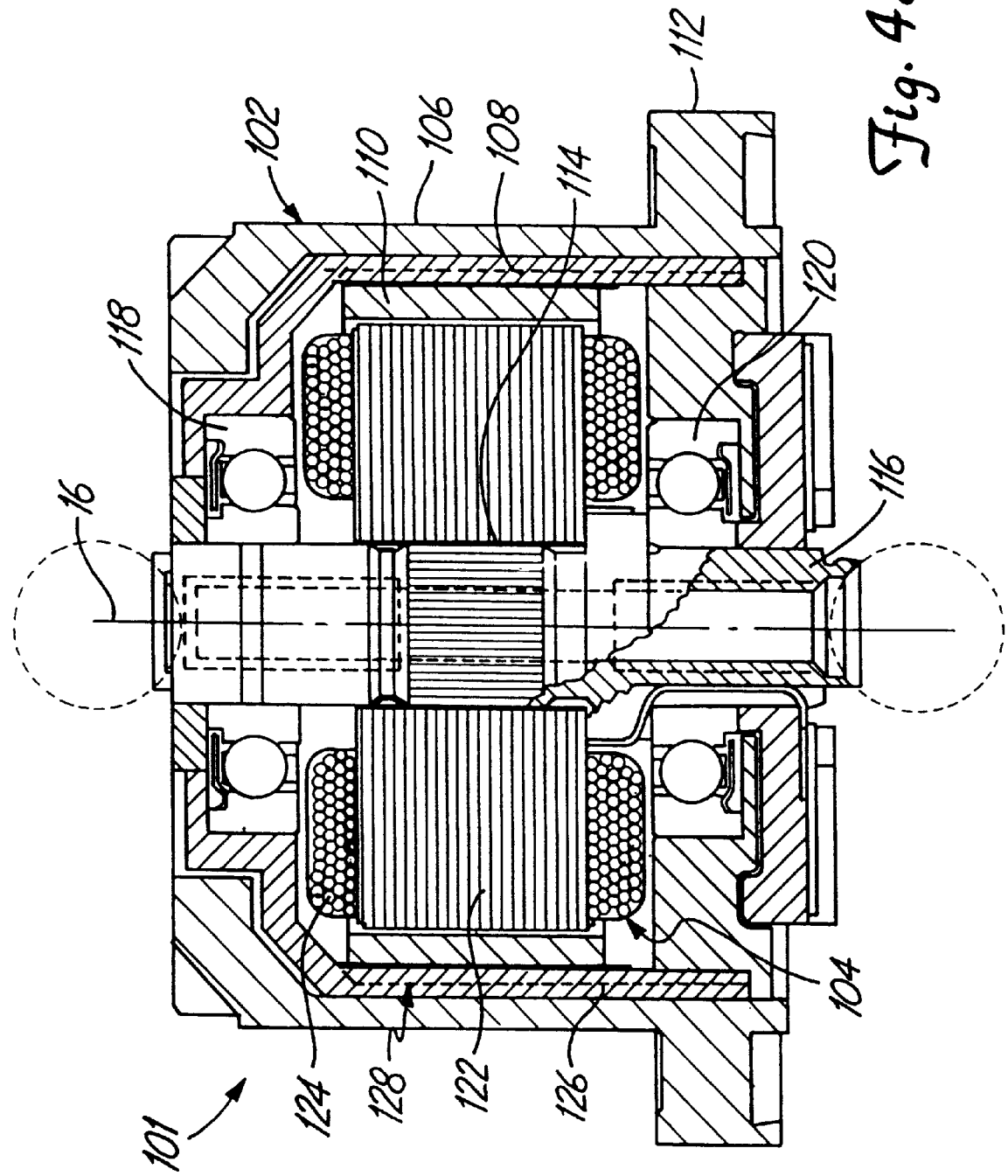

SPINDLE MOTOR HAVING A MAGNET WHICH IS FIELD CENTERED RELATIVE TO THE STATOR

This is a divisional of application Ser. No. 08/437,452, filed May 8, 1995 U.S. Pat. No. 5,664,314.

BACKGROUND OF THE INVENTION

The present invention relates to disc drives More specifically, the present invention relates to a spindle motor in a disc drive and a method of making the motor.

A typical disc drive includes one or more magnetic discs mounted for rotation on a hub or spindle. A typical disc drive also includes one or more transducers supported by a hydrodynamic air bearing which flies above each magnetic disc. The transducers and the hydrodynamic air bearing are collectively referred to as a data head. A drive controller is conventionally used for controlling the disc drive system based on commands received from a host system. The drive controller controls the disc drive to retrieve information from the magnetic discs and to store information on the magnetic discs.

An electromechanical actuator operates within a negative feedback, closed-loop servo system. The actuator moves the data head radially over the disc surface for track seek operations and holds the transducer directly over a track on the disc surface for track following operations.

Information is typically stored on the magnetic discs by providing a write signal to the data head to encode flux reversals on the surface of the magnetic disc representing the data to be stored. In retrieving data from the disc, the drive controller controls the electromechanical actuator so that the data head flies above the magnetic disc, sensing the flux reversals on the magnetic disc, and generating a read signal based on those flux reversals. The read signal is then decoded by the drive controller to recover the data represented by flux reversals stored on a magnetic disc, and consequently represented in the read signal provided by the data head.

Accurate positioning of the data head over a track on the disc is of great importance in writing data to the disc and reading data from the disc.

In current generation disc drive products, the most commonly used type of actuator is a rotary moving coil actuator. The discs themselves are typically mounted in a "stack" on the hub structure of a brushless DC spindle motor. The rotational speed of the spindle motor is precisely controlled by motor drive circuitry which controls both the timing and the power of commutation signals directed to the stator windings of the motor. The hub structure is rotatably coupled to a shaft via a set of bearings. The hub includes a sleeve or back iron portion which carries a magnet. Interaction between the magnet and the stator causes controlled rotation of the hub about the shaft.

Motor acoustic levels are related to the degree of alignment between the stator and the magnet, both axially (along the axis of rotation of the hub) and radially. Alignment of the magnet and stator in both the axial and radial directions is difficult to control during volume production of disc drive motors due to tolerances incurred in producing the magnet and stator parts.

In addition, alignment in the axial direction is difficult because the "magnetic center" of the hub does not necessarily correspond to the "geometric center". In other words, a certain imbalance in the flux field can be caused by the configuration of the back iron. This results in the magnetic center of the magnet relative to the stator being slightly different than the precise geometric center of the two parts.

Currently, the magnet and stator are axially aligned using nominal dimensions. However, the tolerances on the parts allow up to 0.3 mm of misalignment between the two parts. Further, even if the two parts are perfectly geometrically aligned, they may well not be magnetically aligned. Both of these misalignments can be problematic during operation of the drive motor.

SUMMARY OF THE INVENTION

A spindle motor in a disc drive has a rotor assembly rotatably mounted to a base. A stator is mounted to the base and a magnet is mounted to the rotor, assembly. The magnet or the stator is allowed to move axially relative to the other under the influence of magnetic interaction between the magnet and the stator.

The magnet and stator are then rigidly fixed relative to one another in the axial direction.

BRIEF DESCRIPTION OF THE DRAWINGS

FIG. 1 is a side sectional view of one embodiment of a disc drive motor according to the present invention.

FIG. 1A is a side sectional view of a second embodiment of a disc drive motor according to the present invention.

FIG. 2 is a side sectional view of a third embodiment of a disc drive motor according to the present invention.

FIG. 4A is a side sectional view of a seventh embodiment of a disc drive motor according to the present invention.

DETAILED DESCRIPTION OF THE PREFERRED EMBODIMENTS

Figure 3:
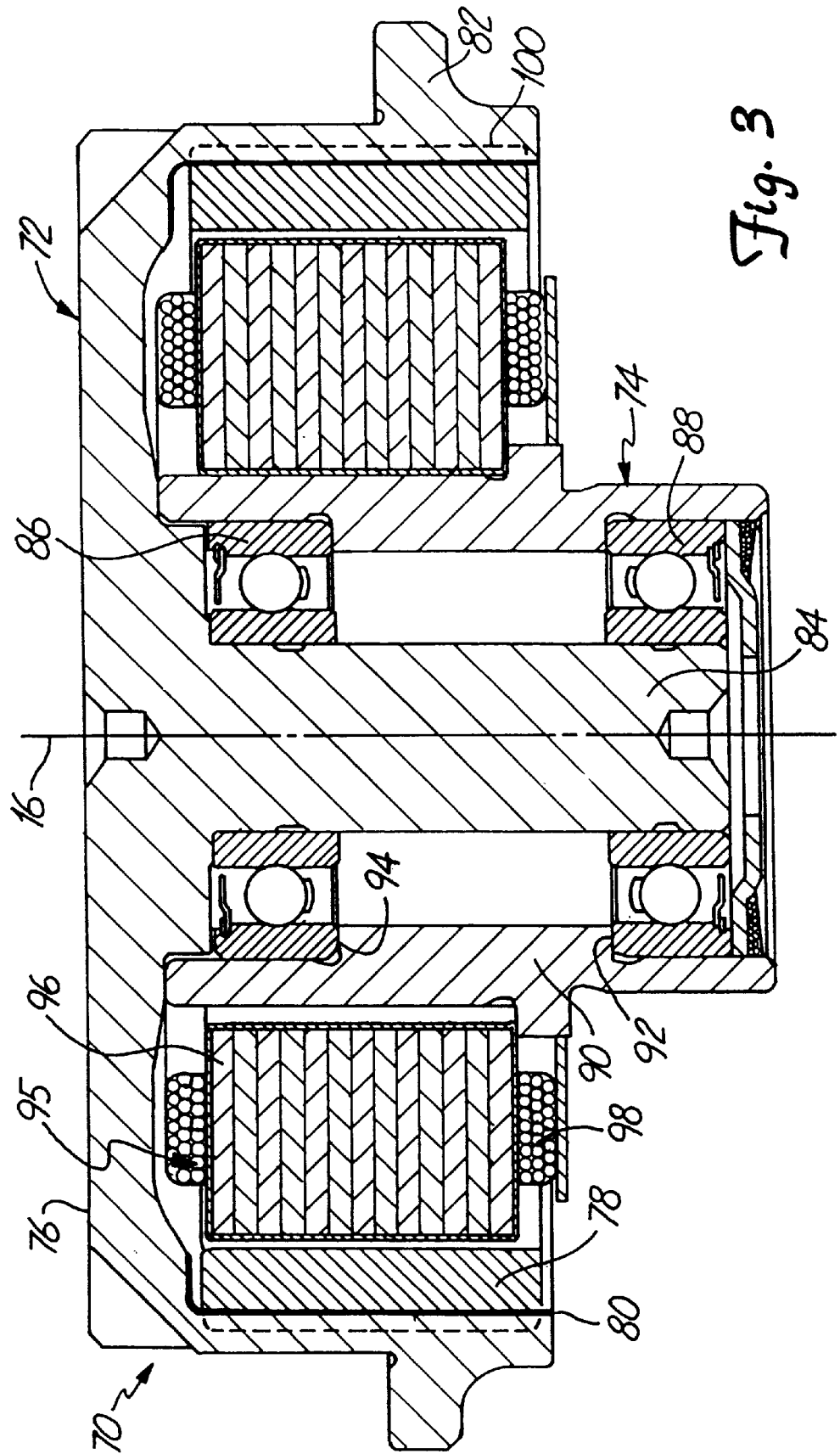
FIG. 3 is a side sectional view of a fourth embodiment of a disc drive motor according to the present invention.

FIG. 1 is a side sectional view of a disc drive motor 10 according to the present invention. Drive motor 10 includes a base 12 and a shaft 14 fixedly attached to base 12. An axis of rotation 16 is generally defined by the longitudinal axis of shaft 14. Motor 10 also includes rotor assembly 17. Rotor assembly 17 includes bearings 18 and 20, bearing holder 22, hub 30 and magnet 40.

Bearings 18 and 20 are disposed about shaft 14 and are supported by bearing holder 22. Labyrinth seal 24 and ferro-fluid seal 26 are disposed generally at opposite axial ends of bearing holder 22 and seal a bearing compartment 28 which holds bearings 18 and 20. Hub 30 is fixedly coupled to bearing holder 22 and has a flange 32. Flange 32 supports magnetic discs (not shown) for rotation about axis 16.

Bearing holder 22 includes a back iron or sleeve portion 34 which is generally cylindrical in shape and is preferably formed integrally with bearing holder 22. Seal holder 36 is formed of a non-magnetic material and is mounted to an inner surface of sleeve 34 to support ferro-fluid seal 26.

Sleeve 34 has an outer periphery defined by a generally cylindrical surface 38. Magnet 40 is coupled to outer surface 38 of sleeve 34. Magnet 40 is a generally annular-shaped magnet disposed about outer surface 38.

Stator windings 42 are rigidly attached to base 12 and are selectively provided with commutation signals. Interaction between the magnetic field generated by stator 42 and magnet 40 causes controlled rotation of rotor assembly 17 about shaft 14.

It is desirable, in assembling motor 10, to have magnet 40 axially aligned (i.e., in a direction parallel to axis 16) with stator 42. It is preferable to have the axial alignment correspond to magnetic axial alignment, rather than simply geometric axial alignment. However, due to dimensional tolerances in manufacturing the parts of stator 42 and magnet 40, misalignment of as much as 0.3 mm can occur in motor 10. Further, even if magnet 40 is coupled to sleeve 34 at the precise geometric center of stator 42, this may not result in optimal motor performance. If sleeve 34 is formed of magnetic material, an imbalance results in the flux field which can cause a shift in the magnetic center between magnet 40 and stator 42 from the geometric center.

With the present invention, this problem is substantially overcome. Magnet 40 is initially movably coupled to sleeve 34 so it can magnetically align itself with stator 42. Once aligned, magnet 40 is rigidly connected to sleeve 34.

In the preferred embodiment, magnet 40 is assembled onto sleeve 34 utilizing an application of a slow curing adhesive 44 between magnet 40 and sleeve 34. The magnet 40 is coupled to the sleeve 34 such that the magnet 40 has longitudinal clearance from the bearing holder 22 at both longitudinal ends of the magnet 40 in order to allow the magnet 40 to move in either axial direction. Thus, after initially being mounted on sleeve 34, magnet 40 is movable in the axial direction, until the adhesive layer 44 cures. While magnet 40 is still movable, rotor assembly 17 is mounted onto base 12, and magnet 40 is brought into a position proximate stator 42. Magnetic interaction between stator 42 and magnet 40 induces a force on magnet 40 tending to center magnet 40 axially relative to stator 42. Since magnet 40 is movable in the axial direction (because the adhesive 44 bonding magnet 40 to sleeve 34 has not cured) magnet 40 is free to move in the axial direction to a position which is magnetically aligned with stator 42. Once in this position, the adhesive 44 is allowed to cure thus rigidly holding magnet 40 in its magnetically centered position. This produces enhanced performance of motor 10. In the preferred embodiment, the adhesive 44 is a commercially available adhesive identified by the trade name DP-460 manufactured by Minnesota Mining and Manufacturing of St. Paul, Minn., or any other suitable adhesive.

FIG. 1A shows a second embodiment of a motor according to the present invention. The motor shown in FIG. 1A is the same as motor 10 shown in FIG. 1, except that slow curing adhesive 44 is applied between stator 42 and base 12. The stator 42 is coupled to the base 12 such that the stator 42 has longitudinal clearance at both longitudinal ends of the stator 42 in order to allow the stator 56 to move in either axial direction. Further, magnet 40 is rigidly attached to sleeve 34. Therefore, when rotor assembly 17 is mounted onto base 12, stator 42 is movable relative to base 12, and relative to rotor assembly 17. Magnetic interaction between stator 42 and magnet 40 induces a force on stator 42 tending to center stator 42 axially relative to magnet 40. Since stator 42 is movable in the axial direction (because the adhesive 44 bonding stator 42 to base 12 has not cured) stator 42 is free to move in the axial direction to a position which is magnetically aligned with magnet 40. Once in this position, the adhesive 44 is allowed to cure thus rigidly holding stator 42 in its magnetically centered position.

FIG. 2 shows a third embodiment of a motor 50 according to the present invention. Motor 50 is similar to motor 10 shown in FIG. 1, and similar parts are correspondingly numbered. However, bearing holder 22 shown in FIG. 1 is formed of a magnetic steel material. Since back iron or sleeve 34 is integrally formed with bearing holder 22, sleeve 34 is also formed of magnetic steel material. An overhang portion 52 of sleeve 34 shown in FIG. 1 extends radially outwardly from axis 16 over magnet 40. Magnet 40 may be attracted to overhang portion 52 or other areas on magnetic bearing holder 22 or sleeve 34 which are undesirable. In order to overcome this problem, motor 50 incorporates a number of differences over motor 10 shown in FIG. 1.

First, motor 50 includes a bearing holder 52 which is formed of non-magnetic steel material. Any suitable non-magnetic steel material can be used. Thus, sleeve 58 (preferably integrally formed with bearing holder 52) is also formed of non-magnetic material).

In addition, rather than having magnet 40 simply being adhered to sleeve 58, a back iron annulus 54 is formed of magnetic steel material. Back iron 54 has an outer diameter which closely approximates the inner diameter of magnet 40. Magnet 40 and back iron 54 are rigidly attached to one another to form a magnet assembly 56. Magnet assembly 56 is then assembled onto sleeve 58 in a manner similar to that in which magnet 40 is assembled onto sleeve 34 in FIG. 1. In other words, a slow curing adhesive layer 44 is applied to the junction between the inner diameter of back iron 54 and the outer diameter of sleeve 58. The magnet assembly 56 is coupled to the sleeve 58 such that the magnet assembly 56 has longitudinal clearance from the bearing holder 52 at both longitudinal ends of the magnet assembly 56 in order to allow the magnet assembly 56 to move in either axial direction. The magnet assembly 56 is then placed proximate stator 42 and allowed to magnetically align itself axially with stator 42. Once this alignment has taken place, motor 50 is held in a position so that magnet assembly 56 does not move until the slow curing adhesive 44 cures to rigidly attach magnet assembly 56 to sleeve 58.

By providing bearing holder 52 of non-magnetic steel, another advantage is achieved. In motor 10 shown in FIG. 1, ferro-fluid seal 26 is coupled to bearing holder 22 through seal holder 36. Seal holder 36 is formed of non-magnetic material to isolate the magnets in ferro-fluid seal 26 from sleeve 34. This allows the magnets to operate so as to generate flux lines which hold the ferro-fluid in place. However, since bearing holder 52 in the embodiment shown in FIG. 2 is formed of non-magnetic material, the magnets in ferro-fluid seal. 26 are directly connected to bearing holder 52. This eliminates the need for bearing holder 36 which, in turn, eliminates assembly steps in assembling motor 50.

In should also be noted that, in the preferred embodiment, radial alignment of magnet 40 with respect to rotor assembly 17 and stator 42 is achieved using the magnet assembly system shown in FIG. 2. The machining of annular back irons 54 can be done with a greater degree of precision than the forming of magnets 40. Therefore, annular back irons 54 are preferably made with a plurality of different outside diameters, but with a constant inside diameter. Magnets 40 are then preferably sorted according to their inside diameter dimensions. As stated previously in the specification, this dimension is variable because of the manufacturing tolerances for magnet 40. These tolerances are typically quite loose tolerances relative to tolerances on the other parts in the motor.

After the magnets 40 are sorted, each magnet is assembled onto an appropriately sized annular back iron 54. This results in a reduction in any radial misalignment which may occur due to manufacturing tolerances of the parts. By reducing radial misalignment, the weight distribution (or balance) of the rotor assembly 17 is improved. This leads to enhanced motor performance.

FIG. 3 shows a fourth embodiment of a motor 70 according to the present invention. Whereas motors 10 and 50 in FIGS. 1 and 2, respectively, are fixed shaft motors, motor 70 in FIG. 3 is formed in a rotating shaft design. Motor 70 includes a hub assembly 72 and bearing holder assembly 74. In the preferred embodiment, hub assembly 72 includes hub sleeve 76 and annular magnet 78. Annular magnet 78 is fixedly attached to an inner peripheral surface of hub sleeve 76 by a slow curing adhesive layer 80. Adhesive layer 80 is preferably formed of the same adhesive used in the embodiments shown in FIGS. 1 and 2. Hub sleeve 76 preferably has an integrally formed annular flange 82. Annular flange 82 provides a support for the magnetic discs which are disposed about hub sleeve 76 for rotation about axis of rotation 16.

Also, in the preferred embodiment, hub sleeve 76 has an integrally formed shaft portion 84. Shaft portion 84, along with the remainder of hub assembly 72, is supported for rotation relative to bearing holder assembly 74 by a set of bearings 86 and 88.

Bearing holder assembly 74 includes a generally cylindrical sleeve portion 90 which is fixedly coupled to a base (not shown). Sleeve 90 includes a pair of annular notches 92 and 94 which are disposed in sleeve 90 to support bearings 86 and 88.

FIG. 3 also shows that stator assembly 95 is disposed about an outer periphery of sleeve 90. Stator assembly 95 includes laminated core 96 and coil 98. Interaction between the magnetic field generated by stator assembly 95 and magnet 78 causes controlled rotation of hub assembly 72 about axis 16.

As with the embodiments shown in FIGS. 1 and 2, hub sleeve 76 is preferably assembled over the outer radial periphery of magnet 78 utilizing an application of slow curing adhesive 80 between magnet 78 and hub sleeve 76. The magnet 78 is coupled to the hub sleeve 76 such that the magnet 78 has longitudinal clearance from the hub sleeve 76 at both longitudinal ends of the magnet 78 in order to allow the magnet 78 to move in either axial direction. Thus, after initially being mounted within hub sleeve 76, magnet 78 is movable in the axial direction, until adhesive layer 80 cures. While magnet 78 is still movable, hub assembly 72 is mounted into bearing holder assembly 74, and magnet 78 is brought into a position proximate stator assembly 95. Magnetic interaction between stator assembly 95 and magnet 78 induces a force on magnet 78 tending to center magnet 78 axially relative to stator assembly 95. Since magnet 78 is movable in the axial direction (because the adhesive layer 80 bonding magnet 78 to hub 76 has not cured) magnet 78 is free to move in the axial direction to a position which is magnetically aligned with stator assembly 95. Once in this position, the adhesive forming adhesive layer 80 is allowed to cure thus rigidly holding magnet 78 in its magnetically centered position.

It should also be noted that a magnet assembly, such as magnet assembly 56 shown in FIG. 2, could also be used with the embodiment shown in FIG. 3. In such an embodiment, a back iron 100 shown in phantom in FIG. 3 is rigidly attached to magnet 78 to form a magnet assembly. Back iron 100 is formed of magnetic steel material and hub sleeve 76 is formed of non-magnetic material. The magnet assembly is inserted within hub sleeve 76 and bonded thereto by the slow curing adhesive described above. This allows the magnet assembly to magnetically center itself before being rigidly affixed to hub sleeve 76. The same type of sorting as that described with reference to FIG. 2 (i.e., sorting according to size of back iron 100 and magnet 78) is also preferably performed to reduce radial misalignments.

Figure 3A:
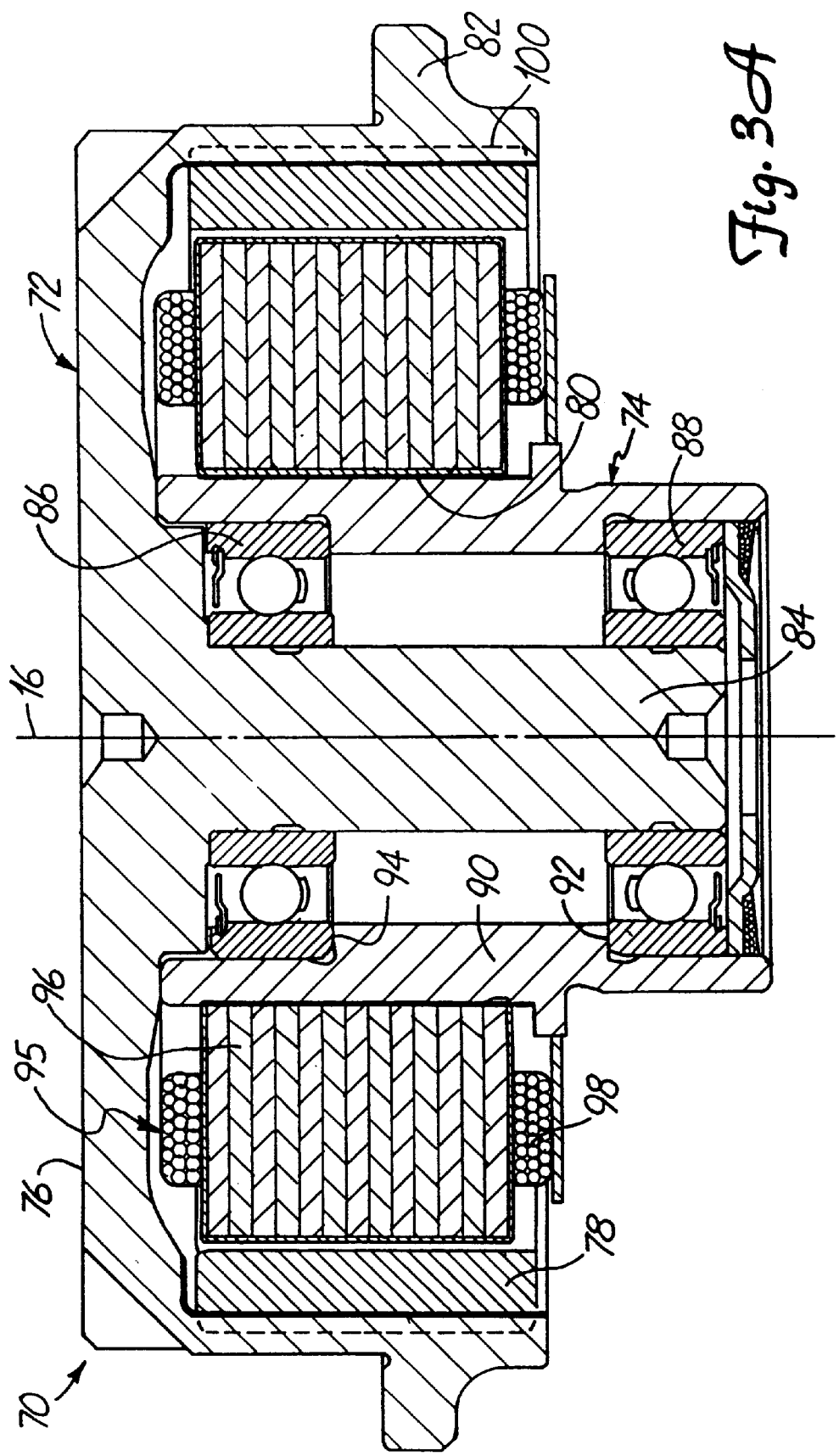
FIG. 3A is a side sectional view of a fifth embodiment of a disc drive motor according to the present invention.

FIG. 3A shows a fifth embodiment of the present invention. Motor 70 shown in FIG. 3A is the same as motor 70 shown in FIG. 3, except that adhesive layer 80 is applied between stator assembly 95 and sleeve 90. This allows stator assembly 95 to center itself with respect to magnet 78 during assembly.

Figure 4:
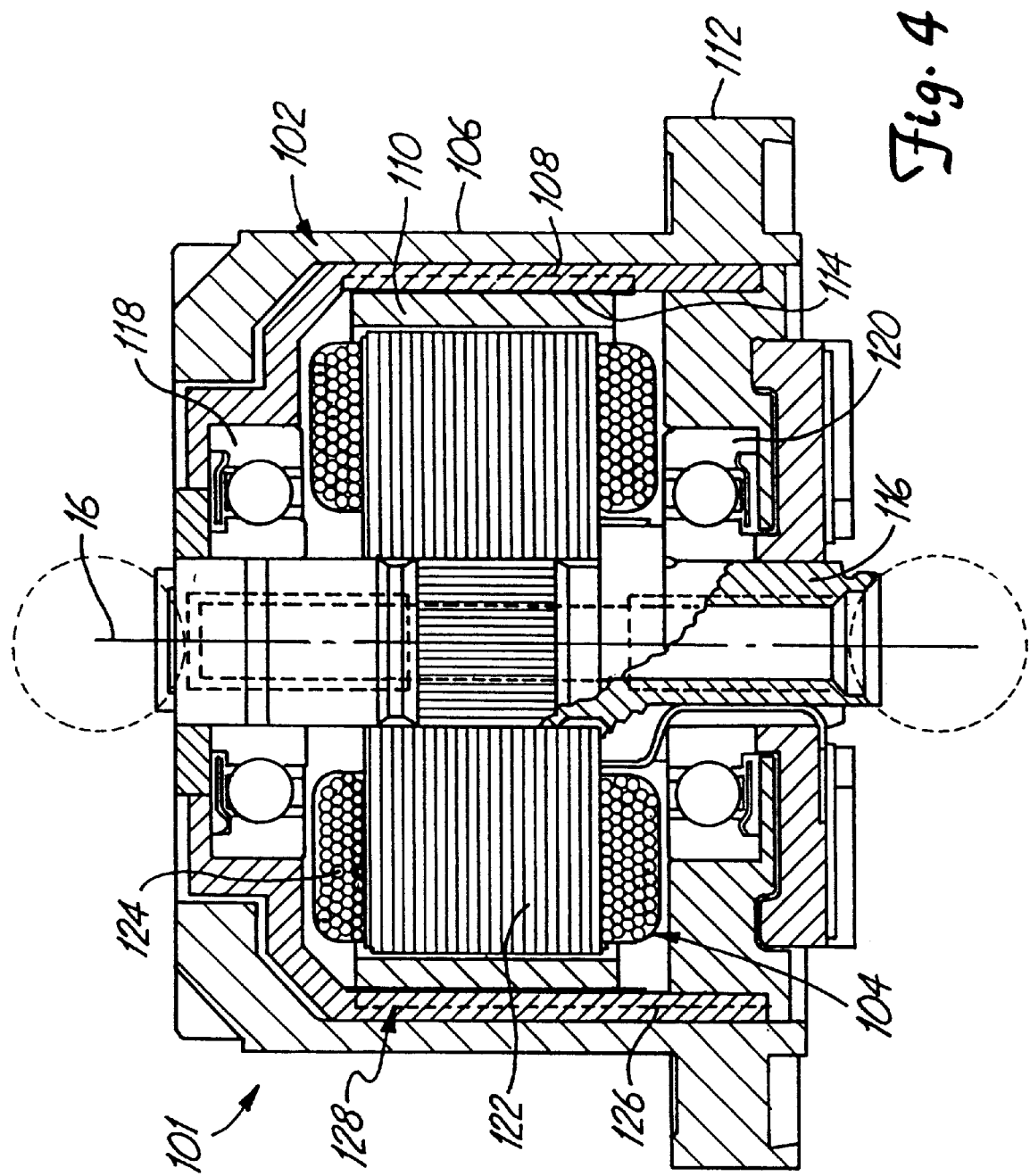
FIG. 4 is a side sectional view of a sixth embodiment of a disc drive motor according to the present invention.

FIG. 4 is a side sectional view of a sixth embodiment according to the present invention. Motor 101 of FIG. 4 is similar to the motors in FIGS. 1 and 2 in that it is a fixed shaft design. However, FIG. 4 is also similar to FIG. 3 in that a hub sleeve carries the annular magnet on its inner peripheral surface.

FIG. 4 includes rotor assembly 102 and stator assembly 104. Rotor assembly 102 includes hub sleeve 106, bearing holder sleeve 108 and annular magnet 110. Hub sleeve 106 has an annular flange 112 which supports magnetic discs mounted about hub sleeve 106. Rotor assembly 102 and the discs mounted on flange 112 are mounted for rotation about axis of rotation 16. Bearing holder sleeve 108 is rigidly attached to hub sleeve 106. Annular magnet 110 is fixedly attached to an inner peripheral surface of bearing holder sleeve 108 by a slow curing adhesive layer 114. Adhesive layer 114 is preferably formed of the same adhesive used in the embodiments shown in FIGS. 1–3. Stator assembly 104 includes shaft 116, the center axial portion of which generally defines axis 16. Shaft 116 has bearings 118 and 120 mounted about the periphery of shaft 116 so that hub assembly 102 is rotatable relative to shaft 116.

Stator assembly 104 further includes laminated core 122 and stator windings 124. Interaction between the magnetic field generated by stator assembly 104 and magnet 110 causes controlled rotation of rotor assembly 102 about axis 16.

As with the embodiments shown in FIGS. 1–3, hub sleeve 106 and bearing holder sleeve 108 are preferably assembled over the outer radial periphery of magnet 110 utilizing an application of slow curing adhesive 114 between magnet 110 and bearing holder sleeve 108. The magnet 110 is coupled to the hub sleeve 106 such that the magnet 110 has longitudinal clearance from the hub sleeve 106 at both longitudinal ends of the magnet 110 in order to allow the magnet 110 to move in either axial direction. Thus, after initially being mounted within hub sleeve 106, magnet 110 is movable in the axial direction, until adhesive layer 114 cures. While magnet 110 is still movable, hub assembly 102 is mounted over stator assembly 104, and magnet 110 is brought into a position proximate stator assembly 104. Magnetic interaction between stator assembly 104 and magnet 110 induces a force on magnet 110 tending to center magnet 110 axially relative to stator assembly 104. Since magnet 110 is movable in the axial direction (because the adhesive layer 114 bonding magnet 110 to bearing holder sleeve 108 has not cured) magnet 110 is free to move in the axial direction to a position which is magnetically aligned with stator assembly 104. Once in this position, the adhesive forming adhesive layer 114 is allowed to cure thus rigidly holding magnet 110 in its magnetically centered position.

It should also be noted that a magnet assembly, such as magnet assembly 56 shown in FIG. 2, can also be used with the embodiment shown in FIG. 4. In such an embodiment, a back iron 126 (shown in phantom in FIG. 4) is rigidly attached to magnet 110 to form a magnet assembly 128. Back iron 126 is preferably formed of magnetic steel material, and bearing holder sleeve 108 is formed, in this preferred embodiment, of non-magnetic material. The magnet assembly 128 is inserted within the hub sleeve 106 and bonded thereto by the slow curing adhesive described above. This allows the magnet assembly 128 to magnetically center itself before being rigidly affixed to hub sleeve 106. The same type of sorting according to size of back iron 100 and magnet 78 as described with reference to FIG. 2 is also preferably performed to reduce radial misalignments in the motor.

FIG. 4A shows a seventh embodiment of a motor according to the present invention. Motor 101 in FIG. 4A is similar to motor 101 in FIG. 4, except that adhesive layer 114 is applied between stator assembly 104 and the shaft defining axis of rotation 16. Thus, stator assembly 104 centers itself axially relative to magnet 110 during assembly of motor 101.

Although the present invention has been described with reference to preferred embodiments, workers skilled in the art will recognize that changes may be made in form and detail without departing from the spirit and scope of the invention.

What is claimed is:

1. A spindle motor in a magnetic disc drive, comprising:
   a base;
   a shaft fixed to the base and defining a longitudinal axis;
   a bearing disposed about the shaft;
   a bearing holder coupled to the bearing, the bearing holder having an extending sleeve;
   a magnet assembly having a first longitudinal end and a second longitudinal end;
   a stator coupled to the base and positioned to interact with the magnet assembly; and
   means for coupling the magnet assembly to the sleeve such that the magnet assembly has longitudinal clearance from the bearing holder at both longitudinal ends of the magnet assembly, said means initially allowing the magnet assembly to move axially relative to the sleeve so as to allow the magnet assembly to magnetically axially align with the stator, said means rigidly fixing the magnet assembly to the sleeve after magnetic axial alignment is complete.

2. The spindle motor of claim 1 and further comprising:
   a ferro-fluid seal directly connected to the bearing holder.

3. The spindle motor of claim 2 wherein the magnet assembly comprises:
   a magnet; and
   a magnetic ring coupled between the sleeve and the magnet.

4. The spindle motor of claim 1 wherein the means for coupling the magnet assembly to the sleeve comprises a slow-curing adhesive.

5. A spindle motor in a magnetic disc drive comprising:
   a base;
   a shaft fixed to the base and defining a longitudinal axis;
   a bearing disposed about the shaft;
   a bearing holder coupled to the bearing, the bearing holder having an extending sleeve;
   a stator having a first longitudinal end and a second longitudinal end;
   a magnet coupled to the sleeve and positioned to interact with the stator; and
   means for coupling the stator to the base such that the stator has longitudinal clearance at both longitudinal ends of the stator, said means initially allowing the stator to move axially relative to the base so as to allow the stator to magnetically axially align with the magnet, said means rigidly fixing the stator to the base after magnetic axial alignment is complete.

6. The spindle motor of claim 5 and further comprising:
   a ferro-fluid seal directly connected to the bearing holder.

7. The spindle motor of claim 5 wherein the means for coupling the stator to the base comprises a slow-curing adhesive.

8. A spindle motor in a magnetic disc drive comprising:
   a shaft defining a longitudinal axis;
   a surface substantially parallel with the longitudinal axis;
   a magnet assembly having a first longitudinal end and a second longitudinal end;
   a stator positioned to interact with the magnet assembly; and
   means for coupling the magnet assembly to the surface such that the magnet assembly has longitudinal clearance at both longitudinal ends of the magnet assembly, said means initially allowing the magnet assembly to move axially relative to the surface so as to allow the magnet assembly to magnetically axially align with the stator, said means rigidly fixing the magnet assembly to the surface after magnetic axial alignment is complete.

9. The spindle motor of claim 8 wherein the magnet assembly comprises:
   a magnet; and
   a magnetic ring coupled between the sleeve and the magnet.

10. The spindle motor of claim 8 wherein the means for coupling the magnet assembly to the surface comprises a slow-curing adhesive.

* * * * *